Feb. 7, 1967     C. JONES     3,302,622

HOUSINGS FOR ROTARY COMBUSTION ENGINES

Filed March 4, 1965     4 Sheets-Sheet 1

INVENTOR.
CHARLES JONES
BY
ATTORNEY

INVENTOR.
CHARLES JONES
ATTORNEY

Feb. 7, 1967     C. JONES     3,302,622
HOUSINGS FOR ROTARY COMBUSTION ENGINES
Filed March 4, 1965     4 Sheets-Sheet 3
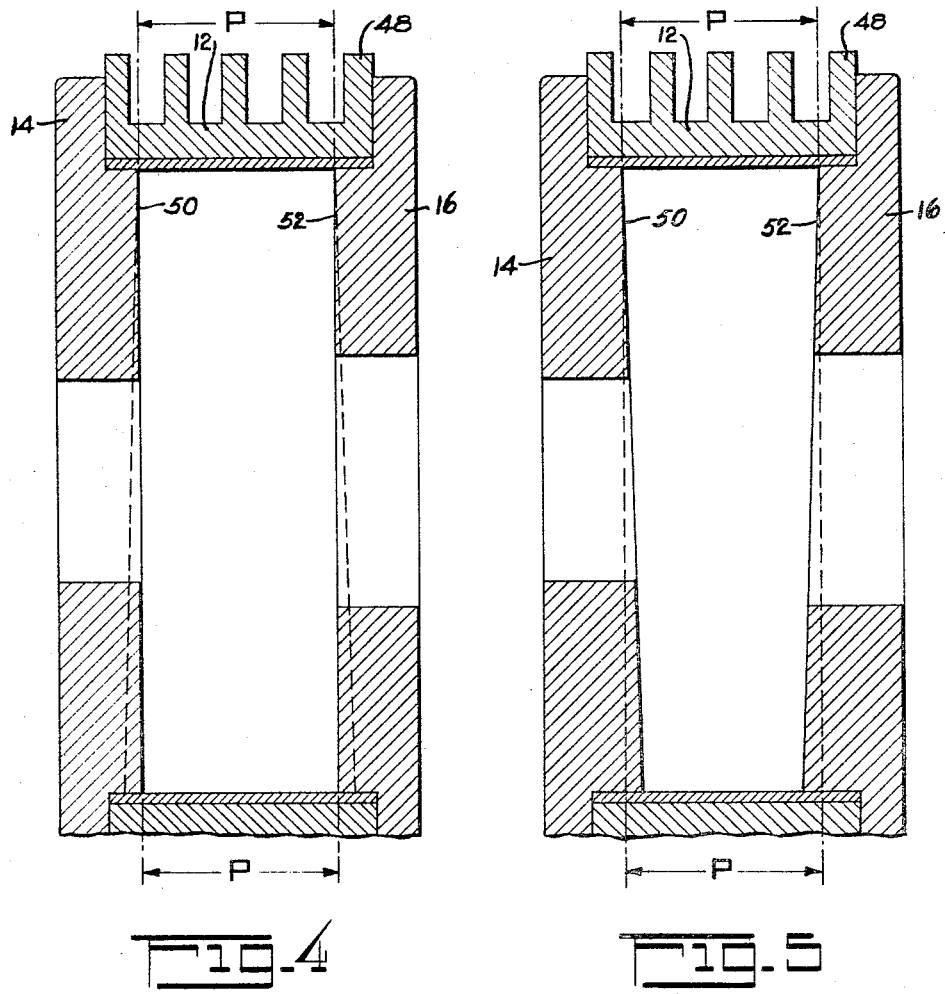
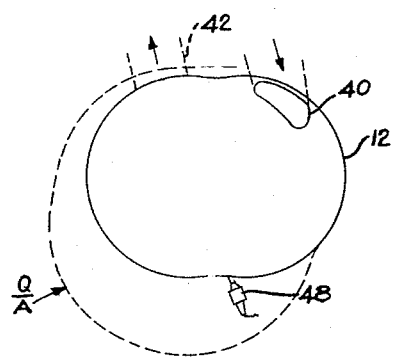
INVENTOR.
CHARLES JONES
BY
ATTORNEY Feb. 7, 1967 C. JONES 3,302,622
HOUSINGS FOR ROTARY COMBUSTION ENGINES
Filed March 4, 1965 4 Sheets-Sheet 4

INVENTOR.
CHARLES JONES
BY
ATTORNEY

United States Patent Office 3,302,622
Patented Feb. 7, 1967

3,302,622
HOUSINGS FOR ROTARY COMBUSTION ENGINES
Charles Jones, Paramus, N.J., assignor to Curtiss-Wright Corporation, a corporation of Delaware
Filed Mar. 4, 1965, Ser. No. 437,076
10 Claims. (Cl. 123—8)

This invention relates to improvements in housings for rotary combustion engines and is particularly directed to a means for constructing the outer body of such combustion engines so that thermal growth of the outer body during operation is compensated for in order to minimize any loss in sealing contact with the working chamber sealing means during normal engine operation.

In general, rotary combustion engines of the type described herein comprise an outer body formed by a peripheral wall interconnected with a pair of end walls to thereby define a cavity whose profile is preferably basically an epitrochoid. A rotatable rotor is supported on a shaft for rotation within the outer body cavity with the outer surface of the rotor defining a plurality of circumferentially-spaced apex portions for sealing engagement with the inner surface of the peripheral wall to thereby form working chambers which upon relative rotation of the outer body and rotor vary in volume. An intake port is provided which admits air or a fuel-air mixture for supplying the combustion zone of said engine, an exhaust port is provided for expelling the burnt gases from said engine and an ignition means may be provided for ignition of the fuel-air mixture whereby the stages of intake, compression, expansion and exhaust may be carried out. The engine may be operated either as a spark ignition engine or suitable means may be provided for operating the engine as a diesel engine.

One characteristic of this type of engine is the nonuniform heat input to the outer body during normal engine operation. As a result of the nonuniform heat input characteristic one portion of the outer body will be subject to relatively greater thermal expansion than other portions which causes relative changes in the cavity defined by the outer body in the region of high heat input. The radially movable apex seal members carried by the rotor, which are in sealing contact with the inner surface of the peripheral wall and with the end walls of the outer body, can be made no longer or have an axial dimension longer than the narrowest spacing between the outer body end walls which will occur in the region of the outer body having a minimum heat input. Accordingly, during normal engine operation, the apex seal may be too short to provide adequate sealing in the relatively hot zone or the region of high heat input and leakage of the working fluid past the axial ends of the seal members may result. It has been found that, during normal engine operation, the inner faces of the outer body end walls, which when the engine is cold, are substantially parallel, assume a nonparallel relationship with the distance therebetween increasing in the hot zone due to the thermal expansion. It will be apparent therefore that there may be some loss of sealing effectiveness due to the thermal growth in the hot zone of the outer body which causes the axial width of the working chambers to increase in this zone.

It is a primary object of the invention to provide an outer body construction including means for compensating for the thermal growth in the hot zone of the outer body during normal engine operation so that sealing contact at the axial sealing surfaces of the working chambers will be maintained. The invention is generally carried out by constructing the end walls and/or the peripheral wall of the outer body in such a manner that said axial confronting faces of the end walls will have a parallel relationship during normal engine operation. Through the construction of the invention, thermal growth of the outer body in the hot portions of the engine will not cause a loss of sealing contact at the axial sealing surfaces for the working chambers.

Accordingly, it is an object of the invention to provide an improved housing construction for a rotary combustion engine which includes means for maintaining axial sealing contact for the working chambers during normal engine operation.

It is another object of the invention to provide a novel and improved housing construction for a rotary combustion engine wherein, when the engine is cold, the axially confronting faces of the end walls of the outer body have a nonparallel relationship and during normal engine operation said end wall faces will have a substantially parallel relationship so as to minimize losses in axial sealing contact between the rotor and said outer body.

It is an additional object of the invention to provide a novel and improved housing construction for rotary combustion engines wherein axial sealing contact between the axial confronting faces of the end walls of said outer body and the axial sealing contact surfaces of the seal members with said faces will be substantially maintained during normal engine operation.

Other advantages and objects of the invention will become apparent upon reading the following detailed description with the accompanying drawings wherein:

FIG. 3 illustrates a typical heat flux representation for a rotary combustion engine of the type embodying the present invention, said figure representing the heat flux during normal engine operation;

FIG. 4 is a partial sectional view of an outer body of a rotary combustion engine diagrammatically representing the change in the disposition of the axial confronting faces of the end walls during normal engine operation in an engine not embodying the present invention;

FIG. 5 is a partial axial sectional view showing an outer body with a rotary combustion engine diagrammatically representing the change in relationship of the axially confronting faces of the outer body end walls during engine operation in an outer body of one embodiment of the present invention.

Figure 1:
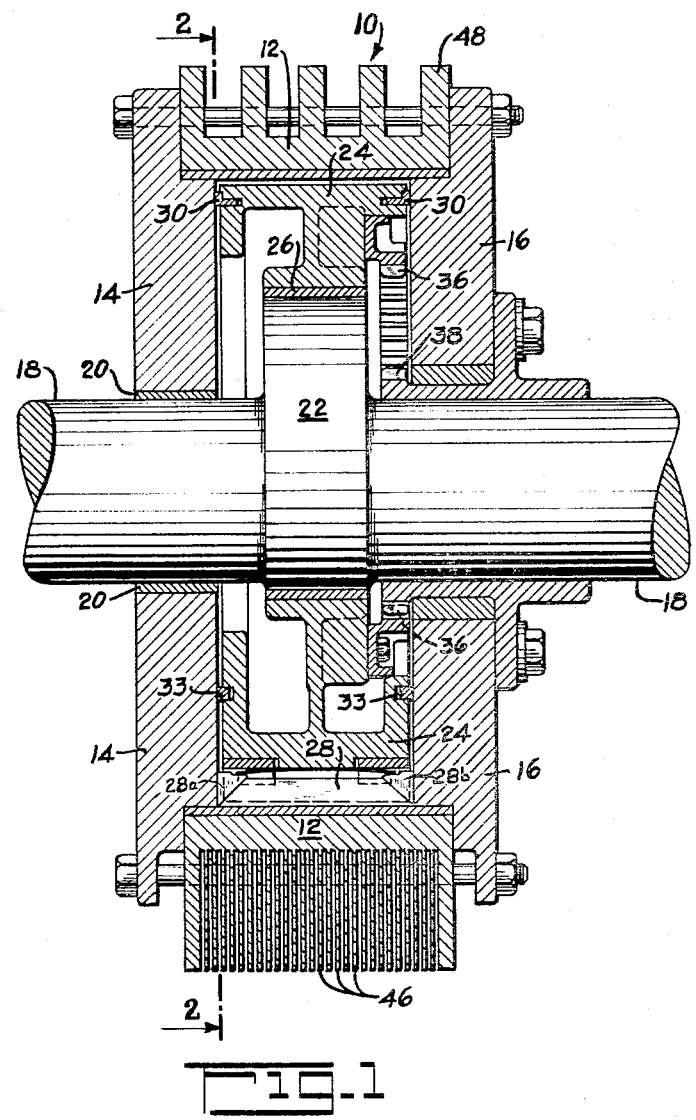
FIG. 1 is an axial sectional view of a rotary combustion engine of the type embodying the present invention.
Figure 2:
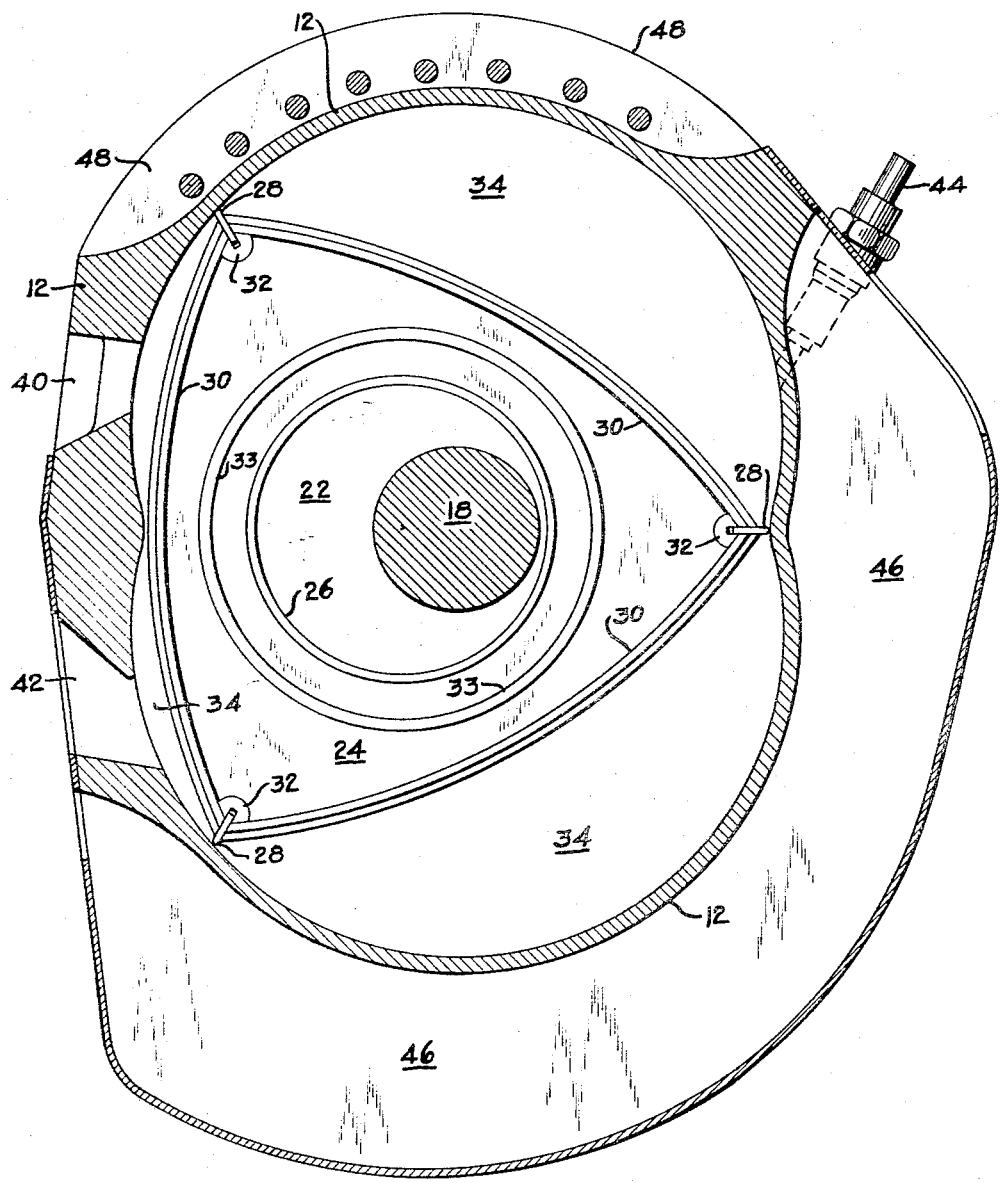
FIG. 2 is a sectional view of FIG. 1 taken along lines 2—2 of FIG. 1.

Referring to FIGS. 1 and 2 there is shown therein a rotary combustion engine having an outer body generally designated at 10. The rotary combustion engine outer body 10 is formed by a peripheral wall 12 interconnected with a pair of spaced end housings or end walls 14 and 16 to form a cavity. As viewed in FIG. 2, the contour of the inner surface of the peripheral wall 12 has a multilobed profile which preferably is basically a two-lobed epitrochoid. A shaft 18 is rotatably supported within the outer body by suitable bearings 20 which shaft 18 has an eccentric portion 22 formed thereon. Rotatably supported on the eccentric portion 22 is a rotor 24, having a suitable bearing 26 therebetween, with said rotor having a plurality of circumferentially-spaced apex portions in each of which there is mounted a radially-movable apex seal strip 28. Preferably, the apex seal strips 28 are axially expandable and may be of three-part construction including a main seal piece 28 with two end portions 28a and 28b which may slide relative to the main seal piece 28 to permit relative axial expansion of the seal member. As will be explained hereinafter, this type of seal construction is particularly useful with the present invention. Reference may be made to copending application, Serial No. 384,056, filed July 21, 1964, by Charles Jones and entitled, "Seal Construction for Rotary Combustion Engines," for a more detailed description of this type of apex seal members. However, the invention is not intended to be limited to the specific seal means shown. The rotor 24 shown in FIG. 2 has three lobed portions joined together to form three apex portions on the rotor. It is of course to be understood that the invention is not limited to a two-lobed cavity and a rotor having three apex portions and it is intended that other combinations may be used, for example, a three-lobed cavity with a rotor having four apex portions.

Seals 30 are provided within each of the side faces of the rotor for sealing engagement with the axially inner surfaces or axially confronting faces of the end walls 14 and 16, which seal members 30 mate with intermediate seal bodies 32, which also aid in supporting the apex seal strips 28 in each of the apex portions, thereby forming a continuous seal for each of the working chambers 34 defined between the apex portions of the rotor and the inner surface of the peripheral wall and end walls. As the rotor and the outer body rotate relative to one another, the working chambers 34, being defined between the apex portions of the rotor and the inner surface of the peripheral wall 12, vary in volume. Oil seals 33 are also provided in each side face of the rotor 24 for preventing oil used in lubricating the bearings 20 and 26 from leaking radially outwardly into the working chambers 34.

An internally toothed gear 36 is supported on the rotor with said gear being disposed in meshing engagement with an externally toothed gear 38 fastened to an outer body end wall, as illustrated, which gears serve to guide the rotor in tracing its epitrochoidal path. An intake port 40 is provided for admitting air or a fuel-air mixture in order to supply the combustion zone of the engine. An exhaust port 42 is provided for expelling the burnt gases from the engine and an ignition means or spark plug 44 may be provided for ignition of the fuel-air mixture. It should be understood however that the spark plug 44 may be eliminated if the engine is operated in accordance with the diesel cycle. It will be seen, that during operation of the engine, the stages of intake, compression, expansion and exhaust will be carried out. Axially spaced cooling fins 46 may be provided on the outer body in the relatively hot portions thereof in order to air-cool the engine and structural reinforcing rib members 48 may be provided in the relatively cool portions of the engine to maintain the outer body rigid during engine operation. The invention is also applicable to liquid cooled engines and is only shown as an air-cooled engine for purposes of illustration.

During normal engine operation, combustion will always take place adjacent the region of the outer body supporting the spark plug 44 with the hot combustion gases being transferred in the direction of rotor rotation for discharge through the exhaust port 42. It will be apparent therefore that this portion of the outer body extending from a region adjacent the spark plug 44 to the exhaust port 42 will become substantially heated up in that it has a relatively high heat input while in the region of the outer body adjacent the intake port 40 the outer body will remain relatively cool due to the absence of combustion in this region. The continual supply of a fresh charge through the intake port 40 will also aid in cooling this region of the outer body. FIG. 3 illustrates in diagrammatic form the heat input to the outer body during normal engine operation with the dotted line portion thereof showing the heat flux represented by the arrow labeled Q/A.

Because the heat input to the outer body is substantially nonuniform, the thermal expansion of the outer body including the peripheral wall 12 and the end walls 14 and 16 will also be substantially nonuniform with the greatest thermal expansion occurring at the regions of highest heat input. Thus, in the regions of high heat input the cavity defined by the outer body will become enlarged due to thermal expansion and in particular the axial width of the cavity will increase in the regions of high heat input. Since combustion takes place adjacent to the inner surface of the peripheral wall 12 and said peripheral wall is relatively thin, the peripheral wall 12 will thermally expand in an axially outward direction and push against the clamped end walls 14 and 16 thereby forcing said end walls axially outwardly. Referring to FIG. 4, there is shown therein a sectional view of an outer body of a prior engine construction, said engine being cold, wherein at least the cavity defining portions of the axially confronting faces 50 and 52 of the end walls 14 and 16 are formed substantially parallel. Thus when the engine is cold, the axially confronting faces 50 and 52 will be parallel but during normal engine operation, in the regions of high heat input, the peripheral wall 12 will be subject to thermal expansion and will grow in the axial direction and push the end walls 14 and 16 axially outwardly so that the axially confronting faces 50 and 52 will no longer be parallel but will assume a position substantially as represented by the dotted lines in FIG. 4. The arrow P in both FIGS. 4 and 5 is used to represent a parallel condition. From the representation as shown in FIG. 4 it will be apparent that the axial confronting faces 50 and 52 of the end walls will not remain in a parallel relationship during normal engine operation. Since the apex seal members 28 can have an axial width no longer than the axial width of the outer body cavity at the coldest portion, when thermal expansion occurs in the relatively hot region during normal engine operation there will be a loss of sealing contact between the side faces of the apex seal members 28 and the axial confronting faces of the end walls 14 and 16. This high heat input region is also the location where the largest pressure differential exists across the sealing element during the working cycle and, therefore, the greatest effect on performance will occur. Also, the side face seals 30, the intermediate seals 32 and the oil seal 33 will not be able to seal as effectively with the axially confronting faces 50 and 52 of the end walls 14 and 16 which therefore results in a further loss in gas sealing effectiveness and a loss in oil sealing effectiveness.

In order to minimize the loss in sealing effectiveness in the regions of the outer body having relatively high heat input, means are provided for compensating for the thermal expansion occurring in these regions. Referring to FIG. 5, which is a sectional view similar to FIG. 4, the arrows P again illustrate a parallel condition. Each of the end walls 14 and 16 according to the invention has at least its axial confronting end face portion 50 or 52 formed so that when the engine is cold the axial distance between the axially confronting faces 50 and 52 in the regions of high heat input is substantially less than the axial distance between said axially confronting faces in the relatively cool regions of the outer body. In other words, instead of the axially confronting faces 50 and 52 being in a parallel condition when the engine is cold they have a substantially nonparallel relationship as illustrated in said FIG. 5. Stated in another manner, each end wall 14 and 16 has a relatively greater thickness in the regions of high heat input than the thickness in regions which are relatively cool so that, when the peripheral wall and end walls become heated up, the thermal expansion of the peripheral wall in the axially outward direction will force the end walls axially outwardly and cause the axially confronting faces to assume a parallel relationship. The dotted lines in FIG. 5 illustrate the condition which the end wall confronting faces 50 and 52 will assume during normal engine operation so that in the regions of high heat input it will be seen that this condition will be a substantially parallel relationship. It may be said that the cavity formed by the outer body in accordance with the invention has a substantially trapezoidal section when the engine is cold. It should be understood that the increase or nonparallel deviation of the axial confronting faces in the invention is relatively small and is only in the neighborhood of a few thousandths of an inch. Preferably the deviation ranges from 1/5 to 1/3 of a percent of the normal width of said peripheral wall in the relatively low heat input region when said engine is cold.

Figure 6:
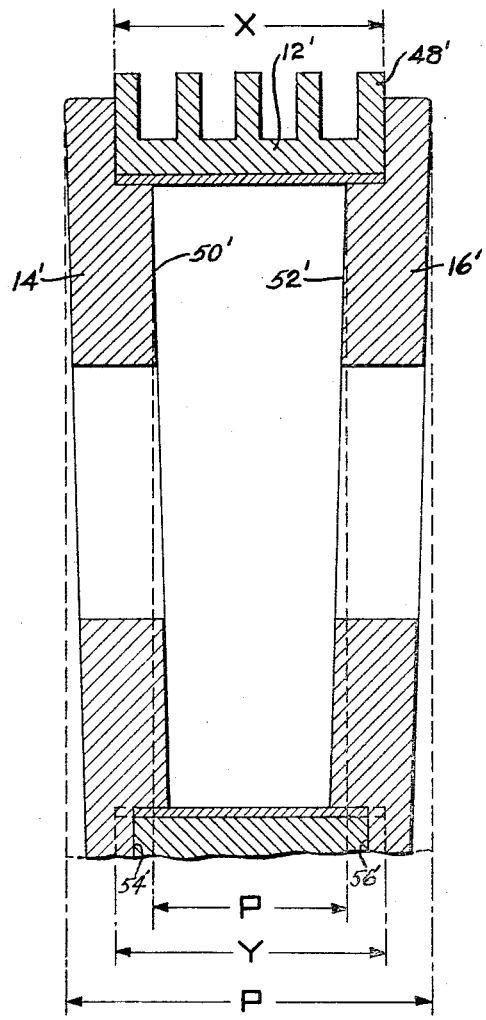
FIG. 6 is a view similar to FIG. 5 showing another embodiment of the invention.

Referring to FIG. 6, there is illustrated therein another embodiment of the invention with like numerals referring to like elements but with a prime (′) added. As explained above, the relatively thin peripheral wall 12′ becomes substantially heated up in the hot region and expands in the axially outward direction toward the end walls 14′ and 16′ which are restrained by the clamping bolts (FIG. 1). The expansion of the peripheral wall 12′ pushes the end walls 14′ and 16′ axially outwardly in opposition to the clamping force so that the axial width of the outer body cavity changes during normal engine operation. FIG. 6 illustrates another construction for compensating for change in the outer body cavity in order to maintain sealing contact between the axial confronting faces 50′, 52′ of the end walls 14′ and 16′ and the axial seal faces of the seal means carried by the rotor.

In the embodiment of FIG. 6, peripheral wall 12′ is constructed so as to have a smaller axial dimension, when the engine is cold, in the relatively hot region than the axial dimension in the relatively cool region. Thus, as illustrated in FIG. 6, the portion of the peripheral wall 12′ at the bottom of said FIG. 6 is shorter than the portion at the top of FIG. 6, the dimensions being slightly exaggerated for purpose of illustration, with the bottom of said FIG. 6 representing the region of relatively highest heat input. As further seen in FIG. 6, the end walls 14′ and 16′ are canted slightly so that they are slightly out of parallel as shown in the solid line position. The mating surfaces 54′ and 56′ or the shoulders where the end walls and peripheral wall meet are machined so that these mating surfaces are flat. In other words, since the end walls 14′ and 16′ are inclined inwardly toward the narrower portion of the peripheral wall 12′, the mating surfaces are machined a comparable amount out of parallel so that the end walls and peripheral wall meet at flat surfaces 54′ and 56′. The solid line illustration of the outer body in FIG. 6 shows the outer body in a cold state.

As the engine becomes heated up during operation the peripheral wall 12′ will expand axially outwardly in the relatively hot region so that said peripheral wall will assume a position as illustrated by the dotted lines in FIG. 6 wherein the axial dimensions of the peripheral wall 12′ will be substantially equal in the relatively hot region and the relatively cool region, as shown by the dimensions arrows X and Y which dimensions are substantially equal. The end walls 14′ and 16′ in response to the expansion of the peripheral wall 12′ will move axially outwardly to the position illustrated by the dotted lines in FIG. 6 wherein the axially confronting faces 50′ and 52′ will be substantially parallel. Thus, as in the case of the prior discussed embodiment, the axially confronting faces of the end walls will move from a nonparallel position to a position wherein said axially confronting faces are substantially parallel.

It will be seen from the invention described in accordance with FIGS. 5 and 6 that when the engine is operating at normal operating temperature the axially confronting faces of the end walls will assume a substantially parallel relationship and there will be little if any loss in effective sealing between said axially confronting faces and the seal means of the engine. It will be understood that in any event there is always some clearance between the seal means and the axially confronting faces of the end walls even when the engine is cold so that there is no chance of the seal means jamming. By taking into account the thermal growth of the housing and the relatively high heat input regions in comparison to the state of said confronting faces when the engine is cold, the engine can be constructed so that there will be sufficient compensation to insure that loss in sealing contact will be minimized even in the presence of thermal growth in said high heat input regions. Of course, it will be apparent that in air-cooled versions of engines of this type, the operating temperatures will be substantially higher than with water-cooled or liquid-cooled versions of these engines. Furthermore, the structural design commonly employed for air cooled housings results in considerably less internal restraint to unrestricted thermal growth than the configurations commonly employed for liquid cooled housings. Thus for air-cooled embodiments, the compensation for thermal growth will have to be slightly greater than for liquid-cooled engines since the thermal expansion will be greater in air-cooled engines. The materials chosen for the outer body will also have some effect on the design of the outer body insofar as the degree of thermal expansion is concerned but in any event the concept of the invention still applies. The outer body is preferably formed of aluminum or magnesium alloys which have a greater coefficient of thermal expansion than, for example, cast iron. For manufacturing purposes, the axially confronting faces 50, 50′ and 52, 52′ of the end walls 14, 14′ and 16, 16′ are machined as flat surfaces. However, it is within the scope of the invention to machine or form these faces in an irregular shape to conform more exactly to the heat input pattern of the outer body. It should also be noted that the use of an axially expandable apex seal means has a particular advantage with the present invention in order to maintain efficient sealing from when the engine is cold until it reaches normal operation temperature. When the engine is cold, the axially expandable seal means will engage the axially confronting seal faces in the relatively cold region of the outer body and as the rotor rotates to the relatively narrower portion of the cavity or the relatively hot region, the axially expandable seal means will compress somewhat to compensate for the difference in width of the cavity. Effective sealing is particularly necessary when the engine is cold since seal leakage at this time may make engine starting difficult. The combination of the axially expandable seal means with the novel outer body construction of the invention substantially eliminates this difficulty.

It will be apparent from the above detailed description that novel and improved housing construction for rotary combustion engines is provided which minimizes losses in sealing effectiveness between the seal means of said engine and the axially confronting faces of the end walls even during thermal growth of said end walls at normal operating temperatures. The construction of the invention is both simple and effective and the concept has application in embodiments of rotary combustion engines other than that illustrated, as for example, a liquid-cooled rotary combustion engine.

While the invention has been set forth in detail in the above description, it should be understood that the invention is not to be limited by the specific details set forth and that various modifications and changes may be made by those skilled in the art without departing from the spirit and scope of the invention as defined in the following claims. For example, the invention is intended to also include a construction including a combination of the inventive concepts disclosed in connection with the two embodiments described and illustrated.

I claim:

1. In a rotary combustion engine having a hollow outer body the inner surface of which defines a cavity and a rotor disposed within said cavity for relative rotation within said outer body, said rotor having a plurality of circumferentially-spaced apex portions having sealing cooperation with the inner surface of outer body to define a plurality of variable volume working chambers, intake means in one region of said outer body for supplying air to said working chambers for combustion therein adjacent a second region of said outer body and exhaust means for discharging the burnt gases produced during combustion from a region adjacent to said second region of said outer body whereby said outer body during normal engine operation has relatively high heat input regions and relatively low heat input regions with said relatively high heat input regions and relatively low heat input regions being circumferentially-spaced such that the heat input to said outer body and thermal expansion resulting therefrom is nonuniform; said outer body comprising a pair of axially-spaced end walls and a peripheral wall interconnected with said pair of axially-spaced end walls, the axial spacing of said end walls, increasing in the relatively high heat input regions relative to the axial spacing in said relatively low heat input regions during normal engine operation, and the dimensions of said peripheral and said end walls being such that said end walls have a nonparallel relationship when said engine is cold with the axial spacing therebetween being relatively less in the portion of said outer body having said relatively high heat input regions than in the portion of said outer body having said relatively low heat input regions, and said nonparallel relationship being such that during normal engine operation when the spacing of said end walls increases in the relatively high heat input regions said end walls will have a substantially parallel relationship.

2. In a rotary combustion engine as recited in claim 1 further comprising ignition means disposed in said outer body between said intake means and said exhaust means relative to the direction of rotor rotation and said relatively high heat input region extending from a region adjacent said ignition means to a region adjacent said exhaust means in the direction of rotor rotation.

3. In a rotary combustion engine as recited in claim 1 wherein said outer body is composed of aluminum, magnesium or alloys thereof, and the spacing between said end walls when said engine is cold being preferably within the range of ⅕ to ⅓ of a percent closer in the narrowest portion of the relatively high heat input region of said outer body than in the relatively low heat input region.

4. In a rotary combustion engine as recited in claim 1 further including apex seal means carried by each apex portion of said rotor, each said apex seal means being disposed for sealing engagement with the inner surface of said peripheral wall and with the associated axially confronting face of each said end wall, and said apex seal means being expandable in the axial direction so that when the engine is cold said apex seal means may compensate for the difference in axial spacing of said end walls between relatively high heat input region and said relatively low heat input region.

5. In a rotary combustion engine as recited in claim 1 wherein said rotor has substantially parallel side faces, one facing each axially confronting face of each of said end walls, and seal means including axially movable side face seal means carried by each side face of said rotor for sealing cooperation between each said rotor side face and its associated axially confronting face of said end walls.

6. In a rotary combustion engine as recited in claim 1 wherein, when said engine is cold, said outer body cavity has a trapezoidal-shaped section when viewed in a direction perpendicular to the engine axis.

7. In a rotary combustion engine as recited in claim 1 wherein the cavity defining portion of said axially confronting faces of said end walls gradually taper toward each other, when the engine is cold, with the closest axial spacing therebetween being in the region of relatively highest heat input to said outer body.

8. In a rotary combustion engine as recited in claim 7 wherein, when said engine is cold, said peripheral wall has a smaller axial dimension in the portion of said outer body having said relatively high heat input region than in the portion of said outer body having said relatively low heat input region and each said end wall having substantially flat surface contact with the associated interconnecting side face of said peripheral wall.

9. In a rotary combustion engine having a hollow outer body and a rotor disposed within said outer body for relative rotation therewith, said rotor having sealing cooperation with the inner surface of said outer body to define a plurality of variable volume working chambers, intake means for supplying air to said working chambers for combustion therein, exhaust means for discharging the burnt gases produced during combustion from said outer body, said outer body during normal engine operation having relatively high heat input regions and relatively low heat input regions with said relatively high input regions and relatively low heat input regions being circumferentially-spaced such that thermal expansion of said outer body is nonuniform; said outer body comprising a peripheral wall and a pair of spaced end walls interconnected with said peripheral wall with a portion of the axially confronting faces of said end walls and the inner surface of said peripheral wall defining the shape of the cavity formed by said hollow outer body, and at least said portion of the axially confronting faces of said end walls having a nonparallel relationship when said engine is cold with the axial spacing therebetween adjacent said relatively high heat input regions being less than the axial spacing adjacent the relatively low heat input regions of said outer body and during normal engine operation thermal expansion of said outer body in the relatively high heat input regions will result in said portion of said axially confronting faces of said end walls being substantially parallel.

10. In a rotary combustion engine, an outer body, said outer body during normal engine operation having relatively high heat input regions and relatively low heat input regions with said relatively high heat input regions and relatively low heat input regions being circumferentially-spaced relative to the engine axis such that thermal expansion of said outer body is nonuniform, said outer body comprising a peripheral wall and a pair of axially-spaced end walls interconnected with said peripheral wall with the inner surface of said peripheral wall and at least a portion of the axially confronting faces of said end walls defining a cavity, and the relationship between said peripheral wall and said end walls being such that when said engine is cold the axial width of said cavity is less in said relatively high heat input regions than the axial width of said cavity in said relatively low heat input regions and during normal engine operation as a result of the nonuniform thermal expansion of said outer body the axial width of said cavity in said relatively high heat input regions and said relatively low heat input regions is substantially equal.

No references cited.

MARK NEWMAN, *Primary Examiner.*

F. T. SADLER, *Assistant Examiner.*